US006831818B2

(12) United States Patent
Dickhoff et al.

(10) Patent No.: US 6,831,818 B2
(45) Date of Patent: Dec. 14, 2004

(54) CURRENT REGULATED VOLTAGE LIMITED HIGH VOLTAGE POWER SUPPLY FOR CORONA CHARGER

(75) Inventors: Andreas Dickhoff, Kirchheim/Teck (DE); Charles H. Hasenauer, Rochester, NY (US)

(73) Assignee: NexPress Solutions LLC, Rochester, NY (US)

( * ) Notice: Subject to any disclaimer, the term of this patent is extended or adjusted under 35 U.S.C. 154(b) by 565 days.

(21) Appl. No.: 09/866,182

(22) Filed: May 25, 2001

(65) Prior Publication Data

US 2002/0191357 A1 Dec. 19, 2002

(51) Int. Cl.[7] .................................................. H02H 7/00
(52) U.S. Cl. ......................................................... 361/18
(58) Field of Search ........................... 361/18, 88, 225, 361/230, 231, 229; 354/3

(56) References Cited

U.S. PATENT DOCUMENTS 4,306,271 A * 12/1981 Weber ........................ 361/229
4,386,834 A * 6/1983 Toolan ........................ 396/661
4,456,825 A * 6/1984 Kuge et al. ................. 250/324
5,572,414 A * 11/1996 Komori ........................ 363/60
5,642,254 A 6/1997 Benwood et al. ........... 361/235
6,654,225 B2 * 11/2003 Takayanagi ................. 361/231

* cited by examiner

*Primary Examiner*—Stephen W. Jackson
*Assistant Examiner*—James A Demakis

(57) ABSTRACT

A method and apparatus for provision of a power supply that combines the advantages of current regulation with voltage limitation to enable corona chargers that can be run at higher current regulated set points for lower resistance sheets. The voltage limit will protect against arcing when high resistance media is used. This wider operation window can be provided without the need to track sheet types in the process and shift the operating set points, which would result in much more complicated machine control algorithms. The regulation and limit reference controls retain the ability of changing the operating set points of the power supply, such that it can be adapted to alternate physical configurations of the discharging system and the printing system.

16 Claims, 2 Drawing Sheets

CURRENT REGULATED VOLTAGE LIMITED HIGH VOLTAGE POWER SUPPLY FOR CORONA CHARGER

BACKGROUND OF THE INVENTION

1. Field of the Invention

The present invention relates to electrostatographic color printing machines and, more particularly, to opposing corona wire chargers placed in the receiver path after the fusing process within a color printing apparatus.

2. Description Relative to the Prior Art

Commercial reproduction apparatus include electrostatographic process copier-duplicators or printers, inkjet printers, and thermal printers. Such reproduction apparatus, pigmented marking particles, ink, or dye material (hereinafter referred to commonly as marking or toner particles) are utilized to develop an electrostatic image of information to be reproduced on a dielectric (charge retentive) member for transfer to a receiver member or directly onto a receiver member. The receiver member bearing the marking particle image is transported through a fuser device where the image is fixed (fused) to the receiver member, for example, by heat and pressure to form a permanent reproduction thereon.

Commonly, a primary charging device is used to uniformly place a charge on a dielectric member prior exposing the dielectric member to an imaging light pattern. Corona charging devices can serve as the primary charging devices, such as one or more parallel thin wires to which high voltage is applied, a housing partially surrounding the wires and open in a direction facing a dielectric member surface, and an electrically biased grid. A conductive housing is used for DC charging and an insulating housing is typically used for AC charging. A grid includes a metallic screen or mesh, mounted between the corona wires and the dielectric member, and is DC-biased for both DC and AC charging. The grid improves voltage control for the voltage that a primary charger imparts to the dielectric member. A grid also gives a resultant dielectric member voltage uniformity that is generally better than without a grid.

Corona wires having a high DC voltage applied to them can asymptomatically approach a cut-off voltage equal to the DC grid bias plus an overshoot voltage determined by grid transparency, grid/dielectric member spacing and corona voltage. This cut off voltage depends upon the amount of the time it takes for the moving dielectric member to pass under a gridded charger. If this time is longer than a characteristic time constant given by the product of the effective charging resistance and the capacitance of the dielectric member under the charger, the voltage on the dielectric member will asymptomatically approach the cut-off voltage. For tight grids (relatively low transparency) the cut-off of the charging current is very close to the grid bias; that is, the overshoot is small. Conversely, for open grids (relatively high transparency) the overshoot can be significant. Typically, grid overshoot is in the range 100–200 volts, depending on the grid to dielectric member spacing, with smaller overshoots for larger spacings.

In charging systems employing high voltage AC charging waveforms riding on low voltage DC offsets to charge corona wires, the cut-off voltage is generally close to the grid bias and is only weakly dependent on the grid transparency. The actual cut-off voltage is determined by the relative efficiencies of negative and positive corona emissions during the negative and positive AC voltage excursions. Moreover, a high duty cycle trapezoidal AC waveform can be used, as disclosed in U.S. Pat. No. 5,642,254 (issued Jun. 24, 1997, in the names of Benwood et al). In this patent, the cut-off voltage is also dependent on duty cycle, and the cut-off voltage steadily approaches a DC value if duty cycle is steadily increased from 50% (conventional AC) to 100% (DC).

A variety of gridded chargers are presently used in typical reproduction apparatus engines. Examples of grid designs include a continuous wire filament wound back and forth across a charger opening, grids (typically photoetched) mainly composed of thin parallel members that run parallel to or at an angle to the corona wire(s), and hexagonal opening mesh pattern grids. These different types of grids are applied in various types of corona chargers, for example, single or multiple corona wire chargers, pin corona chargers, chargers with insulating or conducting housings, and chargers that use AC or DC corona voltage. There are grids that are planar and grids that are curved to be concentric with a drum dielectric member.

Currently, there are a number of prior art systems that regulate the voltage of a corona wire purely by regulating the current. These current regulated prior art systems can, inadvertently, allow the corona wire voltage to increase to critically high values when a receiver element is between the two chargers. Furthermore, systems that employ current regulation of corona wire voltage can also have voltages vary when different receiver elements are used because of the difference in receiver resistivity. Additionally, current regulated systems can also have arcing develop between the opposing corona wires when a highly resistive sheet exits the charger. This can happen before the current regulation control of the power supply can reduce the output voltage of the supply to react to the change in resistance between the corona wires. Arcing results in undesired electrical noise radiated into the control system of the machine and, possibly, to the environment around the machine. Arcing can also be damaging to the machine hardware and materials.

Other prior art systems employ pure peak-to-peak voltage regulation that allows the current potentially to reach critical, high levels when the interframe is in between the two chargers. In this mode the charger will be operating at an unnecessarily high power level and generate excessive heat in the power supply. Corona wire emissions and the resulting chemical emissions will also be unnecessarily high.

From the foregoing, it should be apparent that there remains a need for a power regulation system of corona wires that can avoid the shortcomings of the prior art and provide a solution that prevents arcing and over-current loading for sheet fed applications.

SUMMARY OF THE INVENTION

The present invention is a high voltage power supply for electrostatically discharging prints from a sheet fed printing machine that addresses the prior needs for a power regulation system that can charge corona wires while preventing arcing and over-current loading for sheet fed applications. The power supply has two high voltage outputs that are RMS current regulated and peak-to-peak voltage limited. The current regulation provides a benefit for highly resistive receiver sheets. However, there is a potential for excess voltage that results when using highly resistive receiver sheets, which is corrected by voltage limiting. Each corona wire is connected to one of the two high voltage outputs of the high voltage power supply. The current flow through the ionized air neutralizes and reduces the electrostatic charge in the receivers to uncritical values.

These and other objects of the invention are provided by a power supply for driving opposing corona chargers comprising: a pair of transformers on the power supply, each of the transformers providing an output; a current sense element attached to each of the transformers; a current regulation circuit that is responsive to each of the current sense circuits in accordance with a predetermined parameter to adjust current flowing through the transformers; a voltage monitoring circuit for each of the transformers; and a voltage control circuit that is responsive to the output voltage monitoring circuit to limit the transformer voltage to less than a predetermined value.

BRIEF DESCRIPTION OF THE DRAWINGS

The invention and its objects and advantages will become apparent upon reading the following detailed description and upon reference to the drawings, in which.

DETAILED DESCRIPTION OF THE PREFERRED EMBODIMENTS

Figure 1:
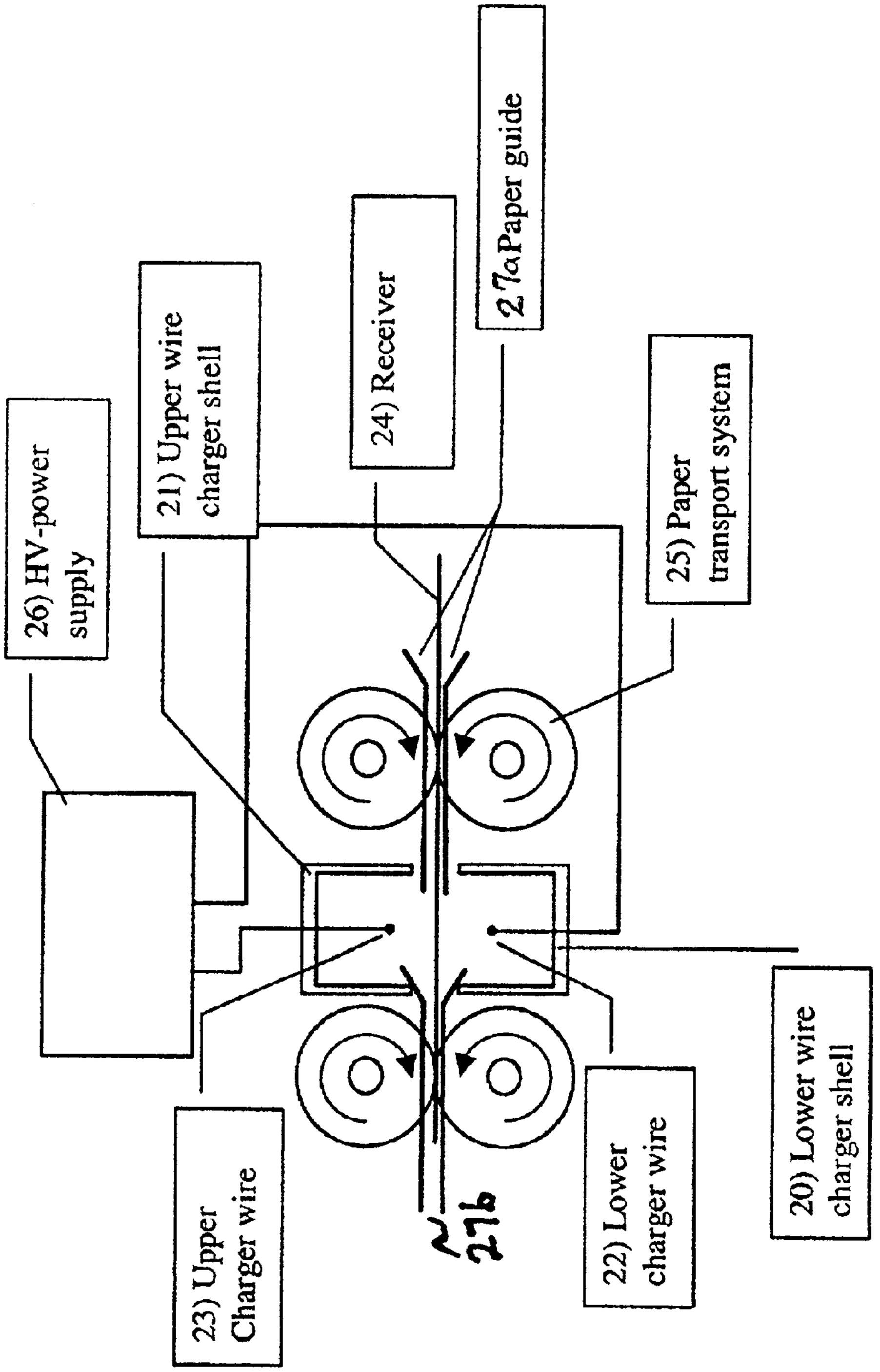
FIG. 1 illustrates a system having opposing wire chargers within a sheet transport system.

FIG. 1 illustrates a sheet transport system within the field of electrophotographic color printing machines, as envisioned by the present invention. Lower corona charger wire 22 and upper corona charger wire 23 are respectively contained within lower wire charger shell 20 and upper wire charger shell 21. The opposing charger wires 22, 23 are paired together and positioned such that they are after the fusing process in such a way that image receiver element 24 is guided through input paper guide 27 and into the space between the two opposing charger wires 22, 23. The charger wires are driven by the high voltage power supply 26. The two charger wires 22, 23 remove the electrostatic charge that is left over on the receiver 24 once the print has been made and after the fusing process is completed. If the left over charge is not removed from the receiver 24, it can cause paper handling problems, like dishevelment in the stacking operation of the sheets, and difficulties in separating the sheets for the finishing operation because the sheets stick to each other.

The preset invention is directed towards the high voltage power supply 26 that is used for the electrostatic discharging of prints from a sheet-fed printing machine. The power supply envisioned has two high voltage outputs that are each RMS current regulated and peak-to-peak voltage limited. Each of the two high voltage outputs of the high voltage power supply 26 is connected to one of the corona charger wires 22 and 23. The output voltage is trapezoidal with a 400 Hz AC frequency. The voltage waveforms of the upper and the lower charger are synchronized at 180 degrees apart to provide maximum current flow between the wires 22 and 23. That current flow through the ionized air neutralizes and reduces the electrostatic charge in the receivers to uncritical values.

FIG. 1 illustrates the opposing corona charger wires 22, 23 located within a sheet transport system, wherein the receiver 24 is a typical load to be driven by charging system. The receiver 24 is discharged as it passes through the two charger wires 22, 23. The basic problem in discharging the receiver 24 using charger wires 22, 23 is that the resistivity between the two opposing charger wires 22, 23 changes significantly once the receiver 24 is removed from the space between the charger wires 22, 23. As the receiver 24 passes through the paper guide 27, there is no longer a load resistance between charger wires 22, 23.

It is not uncommon within the electrostatic discharging of prints from a sheet fed, printing machine that there be multiple stations having charging wiring configurations similar to the corona charger wires 22, 23 seen in FIG. 1. When the receiver 24 is between these multiple stations, it is considered to be interframe, meaning that there is no sheet between the two charger wires 22, 23. Within the context of the present invention, current regulation features will determine the RMS current within the power supply 26 during this interframe period. The present invention also provides a voltage limiting function that determines the maximum peak-to-peak voltage allowed when the receiver 24 is present between charger wires 22, 23.

In a system having a power supply employing pure current regulation of the corona wire, the voltage between the chargers can increase to critically high values when a receiver is between the two chargers. The voltage will also vary with different receivers because of the variation in receiver resistivity. When a highly resistive sheet exits the charger, it is possible for an arc to develop between the opposing corona wires. The arc can develop before the current regulation used to control the power supply can reduce the output voltage of the supply as a response to the change in resistance between the corona wires. Arcing results in undesired electrical noise radiated into the control system of the machine and possibly to the environment around the machine. Arcing can also be damaging to the machine hardware and materials.

In the opposite case employing a pure peak-to-peak voltage regulating function, the current can reach critically high levels in the interframe period. In a peak-to-peak mode, the charger can be operating at an unnecessarily high power level and generate excessive heat within the power supply. The corona emission at the corona wire, and the resultant chemical emissions, will also be unnecessarily high. The combination of both output control methods provides a solution that prevents arcing and over-current loading for sheet fed applications.

Driven by the impedance between the two chargers, the power supply changes automatically from current regulation to voltage limit mode. The impedance between the two chargers refers to the load of the charger relative to wire conditions (clean vs. dirty), wire-to-wire spacing and the dielectric current between the wires (paper, plastic, plastic on paper etc.). The sample resistance is very small in comparison.

Figure 2:
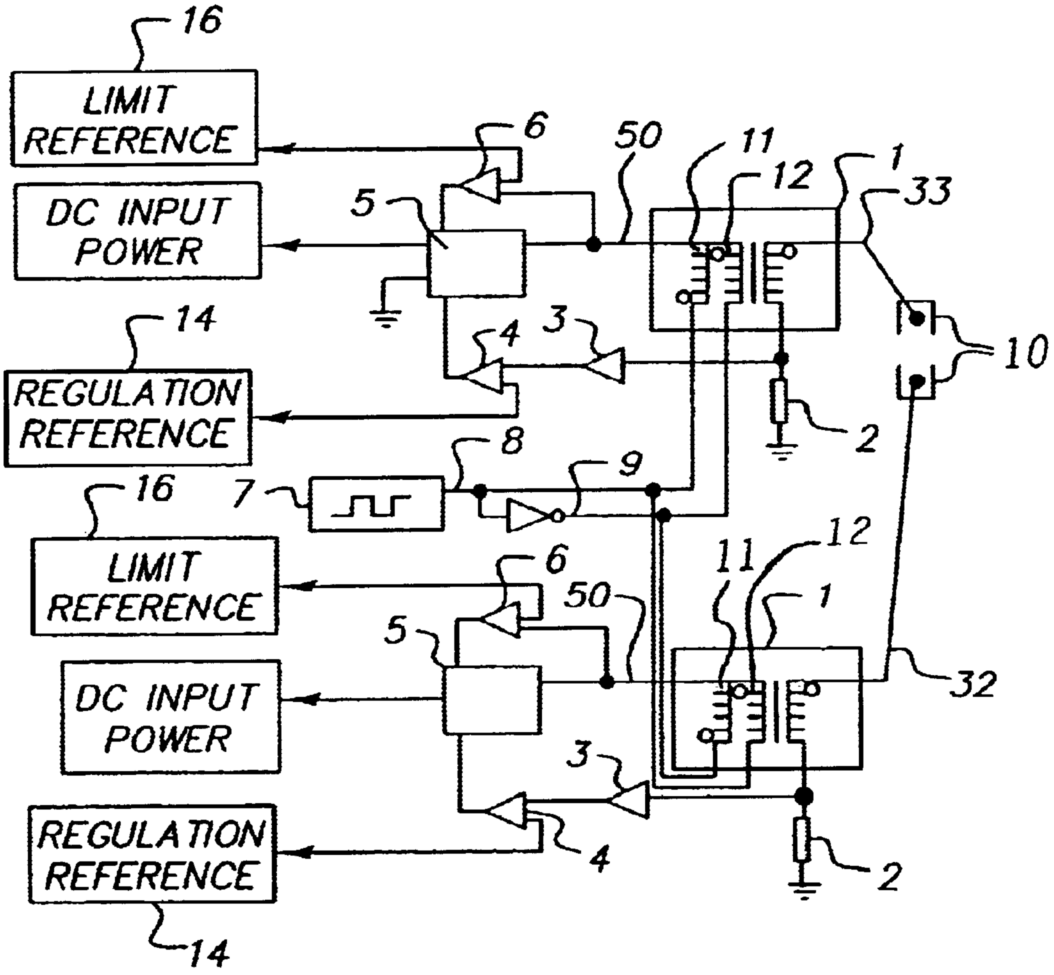
FIG. 2 illustrates the power supply concept of the present invention.

FIG. 2 illustrates the power supply concept. The preferred embodiment is comprised by two nearly identical circuits, one for driving each of the two of output transformers 1 for boosting a low voltage input to a high voltage (3–20 KVpp) AC output which energizes the corona wire chargers 10. The present invention employs current sense elements 2 which, in the preferred embodiment, are a pair of resistors, each connected in series between the ground plane and the return of the high voltage secondary winding of the transformers, to obtain a reading of the voltage developed across the current sense elements 2. This voltage across the current sense element reflects the current that is being sourced by the secondary coil of that transformer 1. The voltage signal is then processed by conditioning circuitry 3 in a feedback loop. In the preferred embodiment the conditioning circuitry 3 is an RMS to DC converter. The conditioned signal is then compared to a regulation reference signal 14 at comparator 4. The regulation reference signal 14 indicates the desired regulation and is an analog DC voltage signal, and the comparator 4 is an operational amplifier. The signal conditioning stage 3, regulation reference signal 14 and comparator 4 sections of the preferred embodiment provide functionality that can be obtained using alternate methods that will be readily apparent to those skilled within the art. Among these methods are the use of pulse-width modulated signals, frequency modulated signals or series techniques with parallel or digital reference signals delivered to the power supply, or some combination of these methods. The regulation reference signal 14 may be generated internally to the power supply or provided by an external controller. An external controller is used in the preferred embodiment. The output of the comparators 4 provides control signals for each of the DC-to-DC converters 5, which, in response, applies a voltage to nodes 50 that is connected at the input side of the primary coils to transformers 1. The DC-to-DC converters 5 adjust the voltage on the primary of transformers 1 to provide a desired regulated current which is determined from the current sourced from the secondary of transformer 1, as discussed above.

There is a potential for excess voltage that results when highly resistive receiver sheets are used, which is corrected by voltage limiting. The output of the DC-to-DC converter 5 is placed on nodes 50 and monitored by the voltage limit comparator 6. The voltage applied to the primary of the transformer is compared to the voltage limit control reference signal 16. Comparator 6 and voltage limit control reference signal 16 are analog in the preferred embodiment. As discussed previously, alternate methods may be used for this function. The voltage limit comparator 6 output imposes a limit on the maximum output voltage of the DC-to-DC converter 5 to node 50, which limits the maximum voltage that can be applied to the corona wire. Alternately, the voltage limit comparison could be made by comparing the high voltage, secondary voltage with the limit reference.

The preferred embodiment of the invention uses two similar circuits in the double primary coils 11, 12 of transformer 1, which are driven by a common clock circuit 7. The clock signal 8 and inverted clock signal 9 are connected to polarity primary windings on the two transformers 1 that have opposite polarities, his can be seen by the circles adjacent to the primary windings indicating polarity. Accordingly, the voltages of the two transformer outputs 32, 33 will be of opposite polarity. In the preferred embodiment, circuits are located on the same printed circuit boar package. An alternate construction places the two circuits in different packages having the clock signal passed from printed circuit board package to the other via a wired connection. To insure that both packages are at the same electrical state, connections need to be provided for a clock output, a non-inverting clock input and an inverting clock input. The electrical wiring of the machine makes connection from the clock output of one unit to non-inverting clock input of that same unit and to the inverting input of the second unit. Alternately, the inverting and non-inverting clock inputs could be switched on both units.

The foregoing detailed description has detailed the best mode known to the inventors for practicing the invention. Other embodiments will be obvious to those skilled in the art. Therefore, the scope of the invention should be measured by the appended claims.

| Parts List | |
|---|---|
| 1 | transformer |
| 2 | current sense elements |
| 3 | conditioning circuitry |
| 4 | comparator |
| 5 | DC-to-DC converter |
| 6 | voltage limit comparator |
| 7 | common clock circuit |
| 8 | clock signal |
| 9 | inverted clock signal |
| 10 | corona wire chargers |
| 11, 12 | primary coils |
| 14 | regulation reference signal |
| 16 | voltage limit control reference signal |
| 20 | lower wire charger shell |
| 21 | upper wire charger shell |
| 22 | lower corona charger wire |
| 23 | upper corona charge wire |
| 24 | image receiver element |
| 26 | high voltage power supply |
| 27 | input paper guide |
| 32, 33 | transformer outputs |
| 50 | nodes |

What is claimed is:

1. A power supply for driving opposing corona chargers comprising:

a pair of transformers on the power supply, each of the transformers providing an output;

a current sense element attached to each of the transformers;

a current regulation circuit that is responsive to each of the current sense circuits in accordance with a predetermined parameter to adjust current flowing through the transformers;

a voltage monitoring circuit for each of the transformers;

a voltage control circuit that is responsive to the output voltage monitoring circuit to limit the transformer voltage to less than a predetermined value; and a clock generation circuit that provides synchronized clocks of opposite polarities to each of the transformers creating AC outputs to the transformers.

2. The power supply of claim 1 wherein the current regulation circuit is a DC-to-DC converter that responds to the current sense circuit by adjusting the transformer voltage.

3. The power supply of claim 1 wherein the current sense circuit is configured to sense voltage from the transformer secondary.

4. The power supply of claim 3 wherein the current sense circuit that is configured to sense voltage from the transformer secondary senses a voltage developed by the flow of current through an element in the series with the transformer secondary.

5. The power supply of claim 1 wherein each of the transformers have a pair of primary coils that are electrically connected to opposite phases of the clock generation circuit.

6. The power supply of claim 5 wherein both the transformers have the primary coils receiving opposite clocks phases such that the transformer secondary coils are synchronized to provide opposing AC outputs.

7. The power supply of claim 1 further comprising a current signal conditioning circuit connected to each of the current sense elements.

8. The power supply of claim 1 wherein the current regulation circuit is a DC-to-DC converter that can be programmed to regulate current through a range by adjusting the transformer voltage and also programmed responsive to the voltage monitoring circuit to limit the transformer voltage.

9. A power supply for driving a corona charger comprising:

a pair of outputs to the power supply;

at least one current sense element connected to the power supply;

at least one voltage monitoring circuit connected to the power supply; and a DC-to-DC converter that is programmed to regulate current through a range of loads in response to the current sense element and also programmed as a voltage limiting device for the power supply; and a clock generation and inverter circuit connected to the power supply to provide synchronizing and opposing AC outputs.

10. The power supply of claim 9 wherein the current sense element is configured to sense voltage from the transformer secondary.

11. The power supply of claim 10 wherein the current sense element that is configured to sense voltage from the transformer secondary senses a voltage developed by the flow of current through an element in the series with the transformer secondary.

12. The power supply of claim 9 further comprising a current signal conditioning circuit connected to the current sense element.

13. A method for supplying power to a corona charger to regulate current without exceeding voltage limitations comprising the steps of:

providing a pair transformers driven at their input with a clock generation and inverter circuit connected to a power supply to provide synchronized opposite phases of an AC signal;

connecting a programmable regulator to the transformers output to apply a DC voltage level at the transformers output;

sensing current being sourced through the transformers by circuitry operatively connected to the transformers inputs and the programmable regulator;

adjusting the DC voltage level provided by the programmable regulator at the transformer output in response to the sensing step;

sensing voltage applied to the transformer output; and responding via the programmable regulator to limit voltage plied to the transformers output in excess of a predetermined amount.

14. The method of claim 13 wherein the step of connecting further comprises connecting a DC-to-DC converter as the programmable regulator, and the DC voltage level applied by the regulator is responsive to sensed current from the transformers to keep current flowing through the transformers constant.

15. The method of claim 14 wherein the step of connecting further comprises responding to voltage sensed at the transformer output to limit the transformer output voltage to a predetermined amount.

16. The method of claim 15 wherein the step of connecting further comprises the DC-to-DC converter being programmed to regulate current through a range by adjusting the transformer voltage.

* * * * *